United States Patent Office

2,834,766
Patented May 13, 1958

2,834,766

COPOLYMERS OF PERFLUOROBUTADIENE AND VINYL ALKYL ETHERS AND METHOD OF PREPARATION THEREOF

John M. Hoyt, Woodside, N. Y., assignor, by mesne assignments, to Minnesota Mining and Manufacturing Company, St. Paul, Minn., a corporation of Delaware No Drawing. Application January 13, 1955
Serial No. 481,690

12 Claims. (Cl. 260—87.5)

This invention relates to novel copolymers of perfluorobutadiene with vinyl alkyl ethers.

The polymerization of perfluorobutadiene at autogenous pressures in the presence of conventional radical-forming promoters leads to the production of polyperfluorobutadienes having molecular weights in the oil and grease range. The use of extreme pressures (16,000 kg./cm.$^2$) is required to produce high polymers having useful mechanical properties. Vinyl ethers also fail to form high molecular weight polymers in the presence of radical-forming promoters. It has now been found, however, that perfluorobutadiene and vinyl ethers readily copolymerize in the presence of radical-forming promoters to form high molecular weight copolymers which are plastic or rubbery in character.

In accordance with the present invention, copolymers of perfluorobutadiene and vinyl alkyl ethers are produced by copolymerizing the monomers to produce copolymers which are of value as protective coatings on metal and fabric surfaces, in producing films and adhesives, and as substitutes for natural rubber. The copolymers exhibit to a significant degree the properties associated with the fluoro- and fluorochloro-carbon plastics such as high thermal and chemical resistance, but possess, in addition, other desirable properties such as improved solubility, workability, and processability in comparison to the fluoro- and fluorochlorocarbon plastics. Marked adhesion of these copolymers to metal surfaces has been noted and it is believed this property is a result of the presence of the ether oxygen in the copolymer.

The vinyl alkyl ethers which may be copolymerized with perfluorobutadiene to produce the copolymers of the invention are those having from 1 to 8 carbon atoms in the alkyl group. Exemplary of such compounds are vinyl methyl ether, vinyl ethyl ether, vinyl n-propyl ether, vinyl isopropyl ether, vinyl n-butyl ether, vinyl isobutyl ether, vinyl t-butyl ether, vinyl 2-ethylhexyl ether, vinyl 2-chloroethyl ether, vinyl 1,1,2,2-tetrafluoroethyl ether and vinyl 1,1,2-trifluoro-2-chloroethyl ether. In addition to halogen, the alkyl group may be substituted with alkoxy groups, as in vinyl 2-methoxy ethyl ether and vinyl 2-butoxy ethyl ether.

The copolymers of the invention may be prepared in various comonomer ratios using any of the conventional alkaline emulsion or mass polymerization recipes. Since acid media tend to promote the hydrolysis of the vinyl ethers, acid emulsion and suspension systems are not suitable for use in the copolymerization reactions of the invention. The pH of the system should be no lower than 6, and preferably is 7 or above. The temperature employed in the copolymerization reaction may be between about —30° C. and 150° C. Where an aqueous system is used, the temperature will be in the range of about 0° C. to 100° C.

For example, an emulsion catalyst system, containing water, soap, and a peroxy compound, may be used. The different types of emulsion systems may be conveniently differentiated on the basis of the catalyst system employed to initiate the polymerization. One type is that in which the polymerization is initiated by employing a redox catalyst system, comprising between about 0.01 to about 1 part by weight per 100 parts of total comonomers present, of an organic oxidant and an activator solution. Exemplary of the organic oxidants which may be used in the emulsion catalyst system are cumene hydroperoxide, diisopropylbenzene hydroperoxide, triisoprylbenzene hydroperoxide, methylcyclohexane hydroperoxide, tertiary-butyl perbenzoate, and tertiarybutyl hydroperoxide. A typical activator solution may consist of about 0.01 to 1.0 part by weight per 100 parts of total comonomers present, of a variable valence metal salt, for example ferrous sulfate, about 0.1 to 10.0 parts by weight of sodium pyrophosphate, and about 0.1 to 10.0 parts by weight of a reducing sugar, such as dextrose, fructose, or levulose.

Another type of emulsion catalyst system is that which comprises about 0.05 to 5 parts by weight per 100 parts of total comonomers present of a persulfate as the oxidant, and which preferably comprises between about 0.1 and about 0.5 part by weight of an inorganic persulfate, such as potassium persulfate, sodium persulfate, or ammonium persulfate.

The soap employed as the emulsifying agent in either the redox or persulfate emulsion catalyst systems is preferably a metal salt, such as the potassium or sodium salt, derived from saturated aliphatic acids, the optimum chain length of the acid being between about 14 and about 20 carbon atoms, or from polyfluorocarboxylic acids or perfluorochlorocarboxylic acids. The polyfluorocarboxylic acid salts which may be used are those disclosed in U. S. Patent No. 2,559,752, and the non-acidic derivatives of the acids disclosed therein as being efficacious dispersing agents in polymerization reactions may also be used in the process of the present invention. The perfluorochlorocarboxylic acid salts which may be used in the process of the present invention are those disclosed in copending application Serial No. 463,073, filed October 18, 1954, as being useful as dispersing agents in polymerization reactions. The soap is generally present in a quantity between about 0.5 and about 10 parts by weight per 100 parts of total comonomers present. The emulsion polymerization is conducted under alkaline conditions, and the pH should be maintained between about 9 and 11 in order to prevent gelling of the soap. The pH may be adjusted, if desired, by the addition of suitable buffers.

As indicated above, the copolymerization reaction also may be carried out under the aforementioned temperature conditions, with a temperature between about —20° C. and 60° C. being preferred, in a mass or bulk polymerization system employing an organic peroxide promoter. Of these promoters, substituted acetyl peroxides are preferably used in carrying out the copolymerization in the temperature range from about —30° C. to about 30° C. Trichloroacetyl peroxide is the preferred promoter of this type. Other halogen-substituted organic peroxides which are suitable for carrying out the copolymerization in a mass copolymerization system in the temperature range from about —30° C. to about 30° C. are trifluoroacetyl peroxide, difluoroacetyl peroxide, 2,4-dichlorobenzoyl peroxide, chloroacetyl peroxide, and perfluoropropionyl peroxide. In the temperature range from about 30° C. to 150° C., the copolymerization reaction may be carried out in a mass or bulk copolymerization system employing organic peroxides such as acetyl peroxide, benzoyl peroxide, lauroyl peroxide, or t-butyl peroxide; in the upper portion of this temperature range, t-butyl peroxide is preferred.

The copolymers of this invention may be prepared at autogenous pressures, i. e., at pressures no higher than about 700 pounds per square inch. The reaction time may be between about 0.1 hour and 100 hours, preferably about 5 to 75 hours.

Polymerization modifiers may also be employed to reduce the molecular weight of the copolymer products and thereby increase the solubility and ease of processing thereof. Exemplary of such modifiers are chloroform, carbon tetrachloride, trichloroacetyl chloride, bromotrichloromethane, and dodecyl mercaptan. These modifiers are generally added in quantities between about 0.1 to 10 parts by weight per 100 parts of total comonomers charged. Chloroform is the preferred modifier.

The invention will be further illustrated by reference to the following specific examples in which all parts are by weight:

EXAMPLE 1

*Copolymer of perfluorobutadiene and vinyl 2-chloroethyl ether*

The following alkaline emulsion polymerization catalyst system was employed in carrying out the polymerization reaction:

| | Parts by weight |
|---|---|
| Water, deionized | 180.0 |
| Total monomers | 100.0 |
| Soap | 5.0 |
| Potassium persulfate | 0.3 |
| Buffer solution (pH 10) | 20.0 |

After flushing a heavy walled glass polymerization tube with nitrogen, the tube was charged with 180 parts of a buffered potassium fatty acid soap solution having a pH of 10 and which was obtained by dissolving 5.0 parts of soap in 160 parts of deionized water, adjusting the pH to 10.0 with a 5 percent solution of potassium hydroxide followed by the addition of 20 parts of a concentrated standard buffer solution having a pH value of 10.0. The polymerization tube was then placed in a solid carbon dioxide-acetone bath. When the contents of the tube were frozen solid, 20 parts of an aqueous solution containing 0.3 part of potassium persulfate were added, and the contents of the tube were refrozen. There were then added 39.6 parts of freshly distilled and purified vinyl 2-chloroethyl ether and, after the contents of the tube were refrozen, the tube was evacuated while connected to a gas transfer system. Thereafter, 60.4 parts of perfluorobutadiene were flash distilled into the tube to make up a total monomer charge containing 50 mole percent of each monomer. The tube was closed and rotated end-over-end in a water bath set at a temperature of 50° C. for a period of 5 hours under autogenous pressure. The contents of the tube were then frozen in a solid carbon dioxide-trichloroethylene bath to coagulate the polymer product. Excess vinyl 2-chloroethyl ether was removed with steam. The coagulated polymer product was collected and dried in vacuo at a temperature of 35° C. The product was a rubber, obtained in a 50 percent conversion of total monomers charged. Analysis for chlorine and fluorine content showed the product to contain 14 mole percent of combined perfluorobutadiene and 86 mole percent of combined vinyl 2-chloroethyl ether.

A flexible and clear film was obtained by pressing this copolymer for 30 seconds at 300° F. at a pressure of 5000 p. s. i. between steel plates covered with aluminum foil.

EXAMPLE 2

*Copolymer of perfluorobutadiene and vinyl ethyl ether*

A polymerization tube was charged with the same buffered soap and potassium persulfate solution and in the same manner set forth in Example 1 above. Thereafter, the tube was charged with 30.8 parts of freshly distilled vinyl ethyl ether and 69.2 parts of perfluorobutadiene, corresponding to a total monomer charge containing 50 mole percent of each monomer. The polymerization was conducted for 22 hours under autogenous pressure at a temperature of 50° C., and the product was worked-up following the general procedure of Example 1 above. A solid product was obtained in an 89 percent conversion, based upon the total monomers charged. Analysis for fluorine content showed this product to contain 47 mole percent of combined perfluorobutadiene and 53 mole percent of combined vinyl ethyl ether.

EXAMPLE 3

*Copolymer of perfluorobutadiene and vinyl isobutyl ether*

The same general recipe of Example 1 above was employed except that 4.5 parts of soap and 16.4 parts of the standard buffer solution were used instead of 5.0 parts and 20.0 parts, respectively. After charging a glass polymerization tube with the buffered soap and potassium persulfate solutions as described in Example 1 above, the tube was further charged with 36.2 parts of vinyl isobutyl ether and 63.8 parts of perfluorobutadiene, corresponding to a total monomer charge containing 50 mole percent of each monomer. The polymerization was conducted for 18 hours under autogenous pressure at a temperature of 50° C., and the product was worked-up following the general procedure of Example 1 above. A short rubber was obtained in a 96 percent conversion, based upon the total monomers charged. Analysis for fluorine content showed the product to contain 52 mole percent of combined perfluorobutadiene and 48 mole percent of combined vinyl isobutyl ether.

A clear film was obtained by pressing this copolymer for 30 seconds at 300° F. at a pressure of 8000 p. s. i. between steel plates covered with aluminum foil. The film strongly adhered to the aluminum foil.

EXAMPLE 4

*Copolymer of perfluorobutadiene and vinyl methyl ether*

Using the same catalyst system and following the same general procedure of Example 1 above, a heavy walled glass polymerization tube is charged with 26.3 parts of vinyl methyl ether and 73.7 parts of perfluorobutadiene corresponding to a total monomer charge containing 50 mole percent of each monomer. The polymerization is conducted for a period of 18 hours under autogenous conditions of pressure at a temperature of 50° C. A solid copolymeric product is obtained.

EXAMPLE 5

*Copolymer of perfluorobutadiene and vinyl 1,1,2-trifluoro-2-chloroethyl ether*

Using the same polymerization catalyst system and following the same general procedure of Example 1 above, a glass polymerization tube is charged with 49.8 parts of vinyl 1,1,2-trifluoro-2-chloroethyl ether and 50.2 parts of perfluorobutadiene corresponding to a total monomer charge containing 50 mole percent of each monomer. The polymerization is conducted for a period of 17 hours under autogenous conditions of pressure at a temperature of 50° C. A solid copolymeric product is obtained.

It will be obvious to those skilled in the art that many modifications may be made within the scope of the present invention without departing from the spirit thereof, and the invention includes all such modifications.

I claim:

1. A copolymer of a vinyl alkyl ether having 1 to 8 carbon atoms in the alkyl group and in which said alkyl group is selected from the group consisting of an unsubstituted alkyl radical, a haloalkyl radical and an alkoxy substituted alkyl radical, and perfluorobutadiene.

2. A copolymer of vinyl 2-chloroethyl ether and perfluorobutadiene.

3. A copolymer of vinyl ethyl ether and perfluorobutadiene.

4. A copolymer of vinyl isobutyl ether and perfluorobutadiene.

5. A copolymer of vinyl methyl ether and perfluorobutadiene.

6. A copolymer of vinyl 1,1,2-trifluoro-2-chloroethyl ether and perfluorobutadiene.

7. A process which comprises copolymerizing a vinyl alkyl ether having 1 to 8 carbon atoms in the alkyl group and in which said alkyl group is selected from the group consisting of an unsubstituted alkyl radical, a haloalkyl radical and an alkoxy substituted alkyl radical, with perfluorobutadiene at a temperature between about −30° C. and about 150° C.

8. A process which comprises copolymerizing vinyl 2-chloroethyl ether and perfluorobutadiene at a temperature between about −30° C. and about 150° C.

9. A process which comprises copolymerizing vinyl ethyl ether and perfluorobutadiene at a temperature between about 30° C. and about 150° C.

10. A process which comprises copolymerizing vinyl isobutyl ether and perfluorobutadiene at a temperature between −30° C. and about 150° C.

11. A process which comprises copolymerizing vinyl methyl ether and perfluorobutadiene at a temperature between about −30° C. and about 150° C.

12. A process which comprises copolymerizing vinyl 1,1,2-trifluoro-2-chloroethyl ether and perfluorobutadiene at a temperature between about −30° C. and about 150° C.

References Cited in the file of this patent

UNITED STATES PATENTS

| | | |
|---|---|---|
| 2,066,330 | Carothers et al. | Jan. 5, 1937 |
| 2,600,802 | Passino | June 17, 1952 |
| 2,631,997 | Stewart | Mar. 17, 1953 |
| 2,647,110 | Wiseman | July 28, 1953 |
| 2,705,706 | Dittman et al. | Apr. 5, 1955 |
| 2,710,854 | Seelig | June 14, 1955 |
| 2,742,454 | Rearick et al. | Apr. 17, 1956 |
| 2,750,431 | Tarrant et al. | June 12, 1956 |